United States Patent [19]
Dao

[11] 3,961,750
[45] June 8, 1976

[54] EXPANDABLE PARALLEL BINARY SHIFTER/ROTATOR

[75] Inventor: Tich T. Dao, Cupertino, Calif.

[73] Assignee: Signetics Corporation, Sunnyvale, Calif.

[22] Filed: Jan. 17, 1975

[21] Appl. No.: 542,080

Related U.S. Application Data

[63] Continuation-in-part of Ser. No. 458,241, April 5, 1974, abandoned.

[52] U.S. Cl............................. 235/164; 340/172.5
[51] Int. Cl.²......................................... G06F 7/00
[58] Field of Search................ 235/164; 340/166 R, 340/172.5

[56] References Cited
UNITED STATES PATENTS

| | | | |
|---|---|---|---|
| 3,800,130 | 3/1974 | Martinson...................... | 235/164 X |
| 3,818,203 | 6/1974 | Perlowski et al................. | 235/164 |
| 3,887,799 | 6/1975 | Lindgren........................ | 235/164 |

OTHER PUBLICATIONS

A. R. Martin & A. B. Rosenstein, "A Shiftrix for High--Speed Multiplication" *IEEE Trans. on Electronic Computers* Aug. 1965 pp. 639–643.

*Primary Examiner*—David H. Malzahn
*Attorney, Agent, or Firm*—Flehr, Hohbach, Test Albritton & Herbert

[57] ABSTRACT

A parallel shifter consists of a plurality of AND gates arranged in a skewed configuration to simulate the partial products of a multiplication of the binary number to be shifted with a second binary number representing $2^N$ where N is the number of shift steps. Pseudo multiplication may be accomplished merely by ORing the outputs of the AND gates of any given binary weight since only one partial product of that weight will be non-zero. Left or right shift is accomplished by selection of the most significant or least significant half of the product. Rotation is accomplished by merging of the two halves.

7 Claims, 12 Drawing Figures

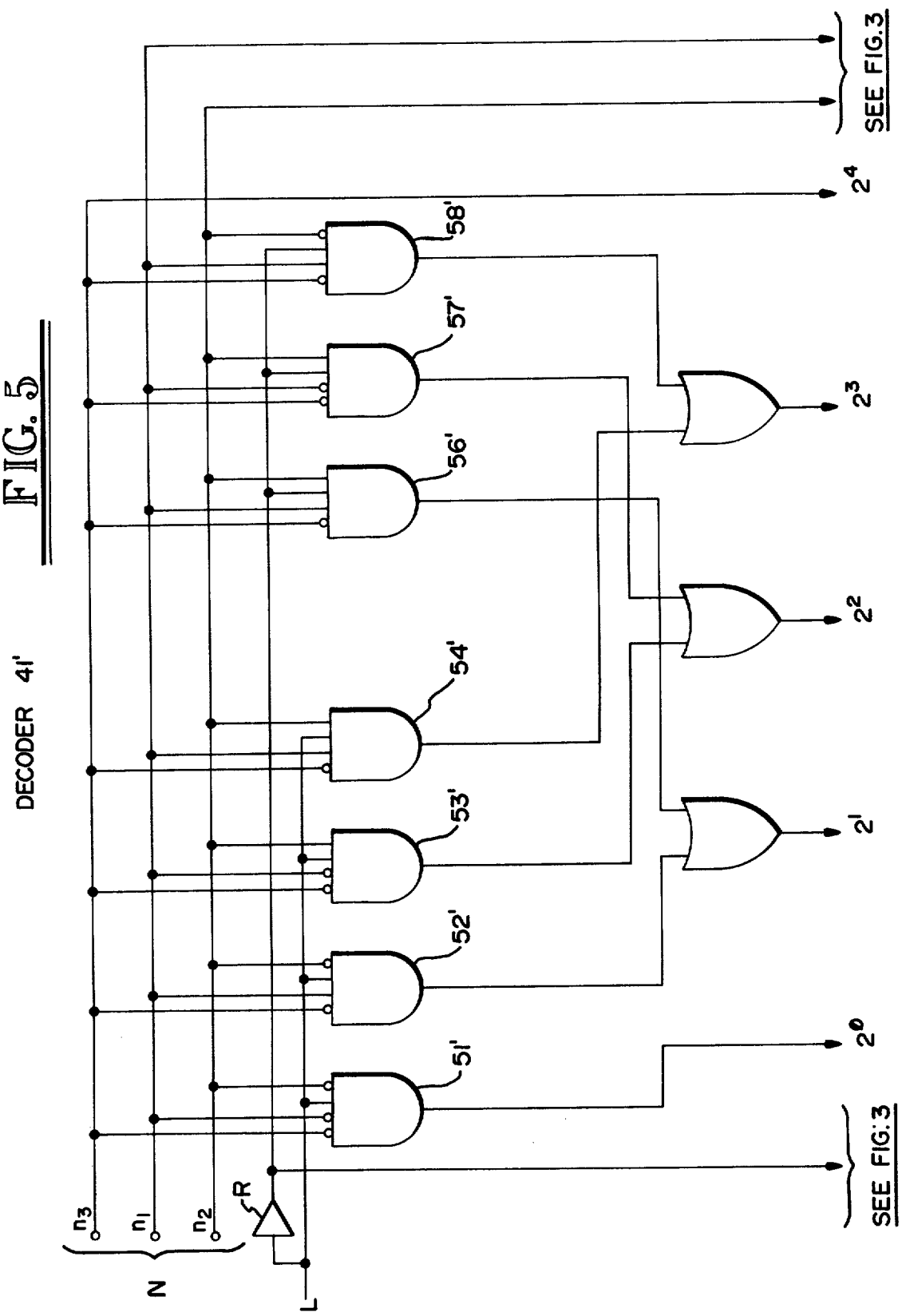

FIG. 6

$$A'_2 \qquad + \qquad A_1$$

A $\overbrace{a_8 2^7 + a_7 2^6 + a_6 2^5 + a_5 2^4} + \overbrace{a_4 2^3 + a_3 2^2 + a_2 2^1 + a_1 2^0}$ $$A_2$$

B $\qquad A'_2 \equiv 2^4 \overbrace{(a_8 2^3 + a_7 2^2 + a_6 2^1 + a_5 2^0)}$

C $\underbrace{b_8 2^7 + b_7 2^6 + b_6 2^5 + b_5 2^4} + \underbrace{b_4 2^3 + b_3 2^2 + b_2 2^1 + b_1 2^0}$ $$B_2 2^4 \qquad + \qquad B_1$$

D $\qquad \times \begin{array}{c} A_2 2^4 + A_1 \\ B_2 2^4 + B_1 \\ \hline A_1 B_1 \\ A_2 B_1 \; 2^4 \\ A_1 B_2 \; 2^4 \\ A_2 B_2 \; 2^8 \\ \hline A_2 B_2 2^8 + (A_2 B_1 + A_1 B_2) 2^4 + A_1 B_1 \end{array}$ E $\quad$ IF $b_2 = 1$ LEFT SHIFT ONE STEP $\qquad (B_1 = 0010$
$\qquad \; B_2 = 0000)$ $$\begin{array}{r}
R = 0 \\
L = 1 \\
N = \begin{cases} n_1 = 1 \\ n_2 = 0 \\ n_3 = 0 \end{cases}
\end{array}
\begin{array}{|cccc|cccc|cccc|cccc|}
\hline
 & & & & 0 & 0 & 0 & a_4 & a_3 & a_2 & a_1 & 0 \\
 & & & & 0 & 0 & 0 & a_8 & a_7 & a_6 & a_5 & 0 \\
 & & & & 0 & 0 & 0 & 0 & 0 & 0 & 0 & 0 \\
0 & 0 & 0 & 0 & 0 & 0 & 0 & 0 & & & & \\
\hline
0 & 0 & 0 & 0 & 0 & 0 & 0 & a_8 & a_7 & a_6 & a_5 & a_4 & a_3 & a_2 & a_1 & 0 \\
\end{array}
\begin{array}{l} A_1 B_1 \\ A_2 B_1 \\ A_1 B_2 \\ A_2 B_2 \end{array}$$

$$\underbrace{\qquad\qquad}_{Y_9 - Y_{16}} \qquad \underbrace{\qquad\qquad}_{\substack{Y_1 - Y_8 \\ (\text{OUTPUT})}}$$

FIG. 8

EX. 1  LEFT SHIFT 5 STEPS $R = 0$
$L = 1$ $$N \begin{cases} n_1 = 1 \\ n_2 = 0 \\ n_3 = 1 \end{cases}$$

|  | $\overbrace{\phantom{xxxxxxxxxxx}}^{A_1}$ |  |  |  | $\overbrace{\phantom{xxxxxxxxxxx}}^{A_2}$ |  |  |  |
|---|---|---|---|---|---|---|---|---|
| A in | $a_8$ | $a_7$ | $a_6$ | $a_5$ | $a_4$ | $a_3$ | $a_2$ | $a_1$ |
| A out | $a_3$ | $a_2$ | $a_1$ | 0 | 0 | 0 | 0 | 0 |
| B | 0 | 0 | 0 | 1 | 0 | 0 | 0 | 0 |

$\underbrace{\phantom{xxxxxxxxxxxx}}_{B_2 \neq 0}$  $\underbrace{\phantom{xxxxxxxxxxxx}}_{B_1 = 0}$

|   |   |   |   |   |   |   |   |   |   |   |   |   |   |   |   |     |
|---|---|---|---|---|---|---|---|---|---|---|---|---|---|---|---|-----|
|   |   |   |   |   |   |   |   | 0 | 0 | 0 | 0 | 0 | 0 | 0 | 0 | $A_1 B_1$ |
|   |   |   |   |   |   |   | 0 | 0 | 0 | 0 | 0 | 0 | 0 | 0 |   | $A_2 B_1$ |
|   |   |   |   |   | 0 | 0 | 0 | $a_4$ | $a_3$ | $a_2$ | $a_1$ | 0 |   |   |   | $A_1 B_2$ |
| 0 | 0 | 0 | $a_8$ | $a_7$ | $a_6$ | $a_5$ | 0 |   |   |   |   |   |   |   |   | $A_2 B_2$ |

---

| 0 | 0 | 0 | $a_8$ | $a_7$ | $a_6$ | $a_5$ | $a_4$ | $a_3$ | $a_2$ | $a_1$ | 0 | 0 | 0 | 0 | 0 |

$\underbrace{\phantom{xxxxxxxxxxxxxxxx}}_{\text{(EX.2 A OUT)} \; Y_9 - Y_{16}}$  $\underbrace{\phantom{xxxxxxxxxxxxxxxx}}_{\text{(EX.1 A OUT)} \; Y_1 - Y_8}$

---

EX. 2  RIGHT SHIFT 3 STEPS $R = 0$
$L = 0$ $$N \begin{cases} n_1 = 1 \\ n_2 = 0 \\ n_3 = 1 \end{cases}$$

| A in | $a_8$ | $a_7$ | $a_6$ | $a_5$ | $a_4$ | $a_3$ | $a_2$ | $a_1$ |
|---|---|---|---|---|---|---|---|---|
| A out | 0 | 0 | 0 | $a_8$ | $a_7$ | $a_6$ | $a_5$ | $a_4$ |
| B | 0 | 0 | 0 | 1 | 0 | 0 | 0 | 0 |

$\underbrace{\phantom{xxxxxxxxxxxx}}_{B_2 \neq 0}$  $\underbrace{\phantom{xxxxxxxxxxxx}}_{B_1 = 0}$

EXPANDABLE PARALLEL BINARY SHIFTER/ROTATOR

CROSS-REFERENCE TO RELATED APPLICATION

This application is a continuation-in-part of application Ser. No. 458,241, filed Apr. 5, 1974, in the name of the present inventor, assigned to the present assignee, and now abandoned.

BACKGROUND OF THE INVENTION

The present invention is directed to a parallel shifter having a minimum time delay and which is useful for both left and right shifting as well as rotation.

When it is desired to translate a binary number from one location in a shift register to another which, for example, might be desirable in floating point arithmetic in a computer storage register, a barrel shifter is useful. This type of switch design is disclosed in an article entitled "A Barrel Switch Design" by R. L. Lim in *Computer Design* dated August, 1972. Such barrel switch is a tree-type network which utilizes a two layer design configuration to provide for different numbers of shift steps. This tree-type decoding design suffers from time delay and because of the two layer structure is not a true parallel shifter.

Another type of shifter is disclosed in an article entitled "32 Bit High Speed Shifter" by A. Perlowski in the Honeywell Magazine published in St. Petersburg, Fla., dated February, 1972. This is a square matrix type of shifter which while truly parallel in configuration has a very complex circuit configuration.

It is also known that a multiplier can be used as a shifter by the technique of shifting the word X by N steps; for example, shifting N steps to the left is equivalent to performing the multiplication $2^N \cdot X$; and shifting right $N$ steps to the right is equivalent to $2^{M-N} \cdot X$ where $M$ is the word length. However, this technique has not been utilized with multipliers because of the inherent layers of time delay.

OBJECTS AND SUMMARY OF THE INVENTION

It is, therefore, an object of the present invention to provide an improved parallel shifter.

In accordance with the above object there is provided a parallel shifter having minimum time delay. Storage register means store a group of bits arranged in increasing weight. A group of OR gates have outputs corresponding to the bits after having been shifted a predetermined direction and number of shift steps. The means for shifting the stored group of bits include a plurality of AND gates each representing a partial product of the group of bits multiplied by a binary number representing a power of 2 such power being indicative of the number of shift steps. The partial products are representative of a final product having bits corresponding to the least significant half of the final product and bits corresponding to the most significant half of the final product. Each of the AND gates have an output respectively coupled to one of the OR gates which has the same relative weight as such AND gate relative to the order of the AND gate in the least significant half or most significant half. The AND gates have inputs connected as follows. Each AND gate is connected to a register bit which is the multiplicand for the partial product represented by such AND gate. First enabling means are responsive to a left shift instruction and is connected to AND gate inputs representing partial products corresponding to the least significant half of the product. Second enabling means are responsive to a right shift instruction is connected to AND gate inputs representing partial products corresponding to the most significant half of the product. Third enabling means have a plurality of outputs each corresponding to the number of shift steps with each output being respectively connected to a group of AND gate inputs representing partial products formed by a common multiplier bit of said binary number.

BRIEF DESCRIPTION OF THE DRAWINGS

FIG. 5 is a more detailed block diagram of a portion of FIG. 4;

FIGS. 6A–6E illustrate the multiplication of an eight bit word in accordance with the other embodiment of the invention;

FIG. 8 are two examples of shifts in accordance with the invention.

DETAILED DESCRIPTION OF THE PREFERRED EMBODIMENT

Figure 1:
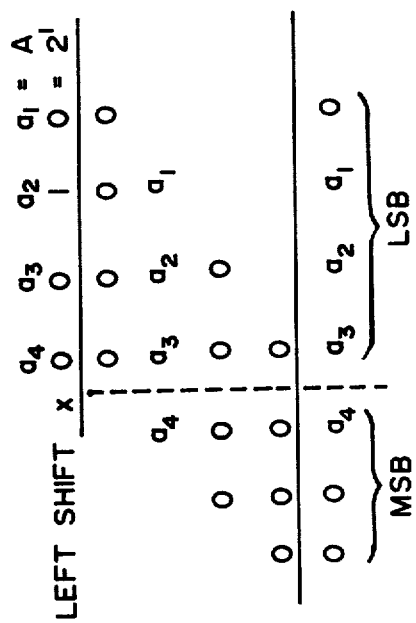
FIG. 1 illustrates the multiplication of a four bit word, to be shifted, by the power of 2 which is useful in understanding the present invention.

FIG. 1 illustrates the multiplication of a word of four bit length designated A which is represented by $a_4$, $a_3$, $a_2$, $a_1$ arranged in increasing weight from right to left by the binary number $2^N$. In the specific example of FIG. 1, $N = 1$ and will, therefore, provide in the product a binary number shifted to the left one step as illustrated. Such product is divided into a most significant bit (MSB) half and a least significant bit (LSB) half since it is well known that the product of two words, for example, four bits in length each, can be an eight bit length or the total length of the original multiplier and multiplicand. From inspection of FIG. 1, it is apparent that the most significant bit half of the product, that is, $000a_4$ is a right shift of three positions. Thus, by selecting the least significant or most significant half of the product a shift in either direction can be produced.

Finally, if the left and right halves of the product are merged to form $a_3, a_2, a_1, a_4$. This is equivalent to a left rotation of one position or a right rotation of three positions. Thus, the right shift/rotation of K positions is equivalent to a left shift/rotation of M-K where M is the original word length.

The principle illustrated in FIG. 1 can be implemented in accordance with the invention by a pseudo multiplication technique by utilizing the fact that only one partial product for a given weight is not identical to zero. Thus, partial products of each weight can be summed by a simple ORing technique which eliminates the excessive time delays produced by ordinary multipliers due to their multi-layer modulus 2 addition.

Figure 2:
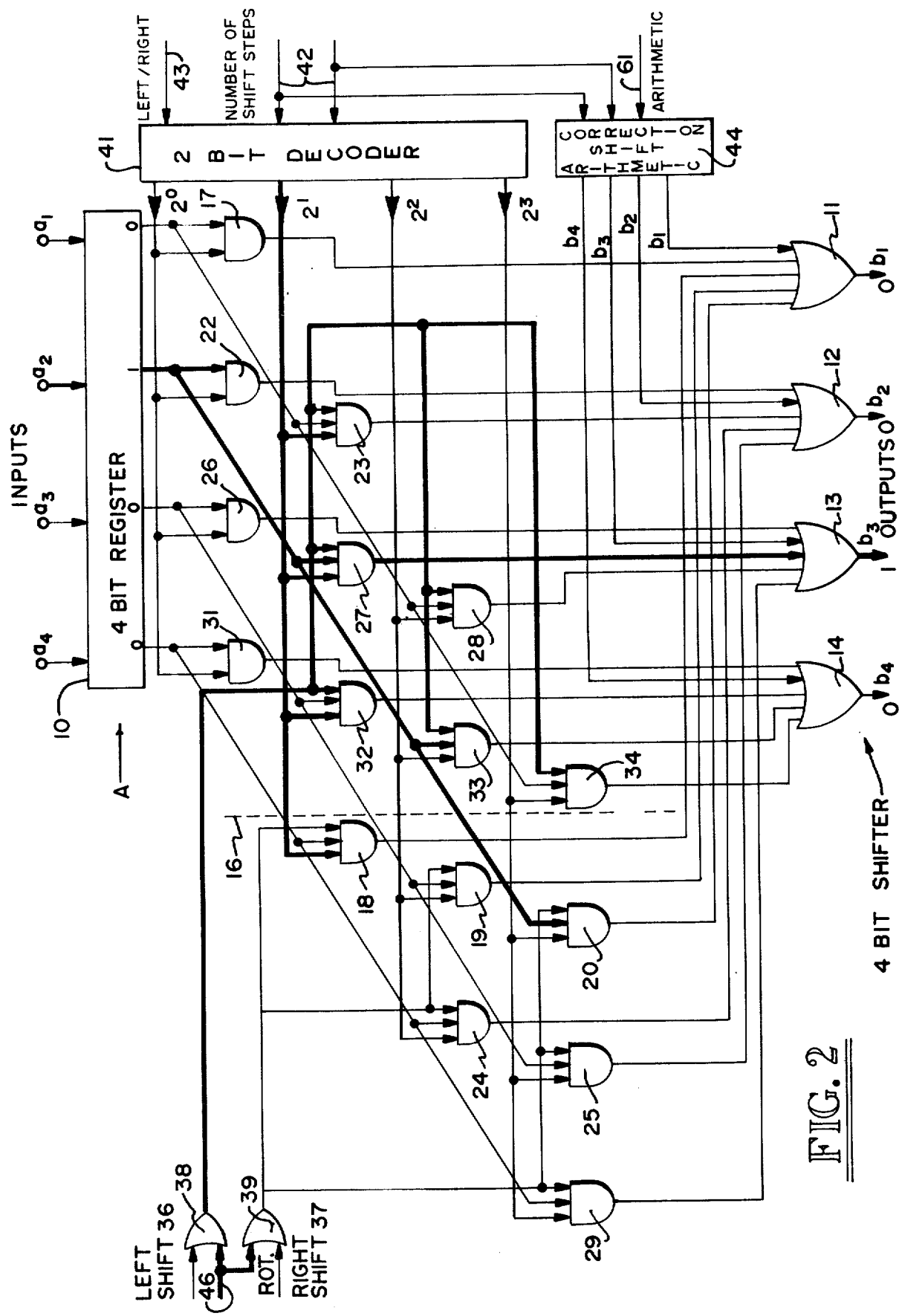
FIG. 2 is a block diagram embodying the present invention emphasizing one particular operation by the use of darkened lines.

Now referring to FIG. 2, a shift register 10 stores the four bit number A. FIG. 2 illustrates the same multiplication as FIG. 1 by the heavier lines which are activated. Thus, the four bit shift register, for example, has the binary number $A = 0010$ stored in it. The final output shifted left once will be equal to 0100. Such outputs are indicated as $b_1, b_2, b_3$ and $b_4$. These occur at the OR gates 11, 12, 13 and 14. Each OR gate has an output which corresponds to one of the original bits $a_1$ through $a_4$ after having been shifted a predetermined direction and number of shift steps.

A plurality of AND gates as illustrated represent the partial products of the binary word A multiplied by the appropriate power of 2 and correspond identically to the partial products shown in FIG. 1. AND gates representing the most significant bit half of the final product are delineated from the AND gates representing the least significant bit half of the product by the dashed line 16. Each AND gate has an output respectively connected to one of the OR gates 11 through 14 which has the same relative weight as the AND gate relative to the order of such AND gate in the least significant half and the most significant half of the product. Specifically, AND gate 17 corresponds in the example of FIG. 1 to the cross product of 0 times $a_1$, and is connected to OR gate 11 which also has connected to it the outputs of AND gates 18, 19 and 20. These three gates are of the same weight and in the least significant bit position of the most significant half of the product. Similarly, the outputs of AND gates 22, 23, 24 and 25 are connected to the inputs of OR gate 12; the outputs of AND gates 26, 27, 28 and 29 are connected to the inputs of OR gate 13; and the outputs of AND gates 31, 32, 33 and 34 are connected to the inputs of OR gate 14. From examination of the configuration of FIG. 1 and FIG. 2, it is apparent that such connections have in effect merged the cross products of the most significant half of the final product with the cross products of the least significant half of the final product.

In general, each of the AND gates with the exception of AND gates 17, 22, 26 and 31 in the first level of the partial product multiplication have three inputs which must be simultaneously enabled to produce the appropriate output. Such inputs are supplied by first enabling means which are responsive to a left shift instruction indicated at 36 and second enabling means responsive to a right shift instruction indicated at 37. The left shift instruction input is connected to an OR gate 38 with all of the AND gate inputs representing cross products corresponding to the least significant half of the product; in other words, all of the AND gates to the right of the dashed line 16 with the exception of the first level AND gate 17, 22, 26 and 31. The specific example given in FIG. 2 is of a left shift. This particular line, the output of OR gate 38, is activated and is shown darkened.

Similarly, the right shift instruction line is coupled from an OR gate 39 to all AND gate inputs representing the cross products corresponding to the most significant half of the product which specifically are to the left of dashed line 16 and include AND gates 18, 19, 20, 24, 25 and 29. Thus, the left shift and right shift instructions provide for selection of either the least significant bit half of the product for left shift or the most significant bit half of the product for right shift.

A second input to all of the AND gates is the binary data contained in the four bit register 10. Moreover, this is a selective connection with a particular bit of the register A being connected only to AND gates in a particular skew line. This skew line is, of course, formed by all of the AND gates which represent the cross product formed by the same multiplicand; in other words, in the case of AND gate 17, 23, 28 and 34 these AND gates represent cross products referring to FIG. 1 which are all formed by the multiplicand bit $a_1$. Similarly, the inputs of AND gates 22, 27, 33 and 20 are connected in common and to $a_2$; AND gates 26, 32, 19 and 25 are connected in common along with the register bit $a_3$; and the inputs of AND gates 31, 18, 24 and 29 are connected in common with the register bit $a_4$.

The third input to the AND gates is provided by third enabling means having a plurality of outputs each corresponding to the number of shift steps of the instruction word which are to be accomplished. Such means includes a two bit decoder 41, four output lines designated $2^0, 2^1, 2^2,$ and $2^3$, each of the output lines representing shifts of 0, 1, 2 or 3. The number of shift steps N to be accomplished is inputed into decoder 41 by a two bit input line 42. In addition, left/right instructions are inputed at line 43 where true on the line indicates a left shift and a false a right shift. The output line $2^0$ of decoder 41 is coupled to the first level AND gates 17, 22, 26 and 31 which of course, represent partial products formed by a common multiplier bit of the binary number which represents $2^N$.

In the specific example of a left shift of one step given in FIG. 2, the $2^1$ output line of decoder 41 is activated to thus activate or close AND gate 27 to produce a 1 output on the AND gate as indicated which is transferred to OR gate 13 which has a 1 output. Since no other AND gate is closed, the remaining outputs will be 0. Thus, the original binary number 0010 which was inputed into the register 10 has been shifted one position to the left.

Arithmetic shift correction means indicated by block 44 are also connected to OR gates 11, 12, 13 and 14 and are responsive to the number of shift steps to insert binary 1s in the OR gates which would otherwise have a vacant or 0 output due to the shifting action. The arithmetic shift correction outputs are indicated by the asterisked outputs $b_1, b_2, b_3, b_4$.

Rotation of the binary bits in shift register 10 is provided by a rotation instruction indicated at 46 which is coupled to both OR gates 38 and 39. Thus, the first and second enabling means are concurrently activated whereby the most and least significant product halves are merged at the OR gates 11, 12, 13 and 14. As discussed above, this provides for rotation.

Figure 3:
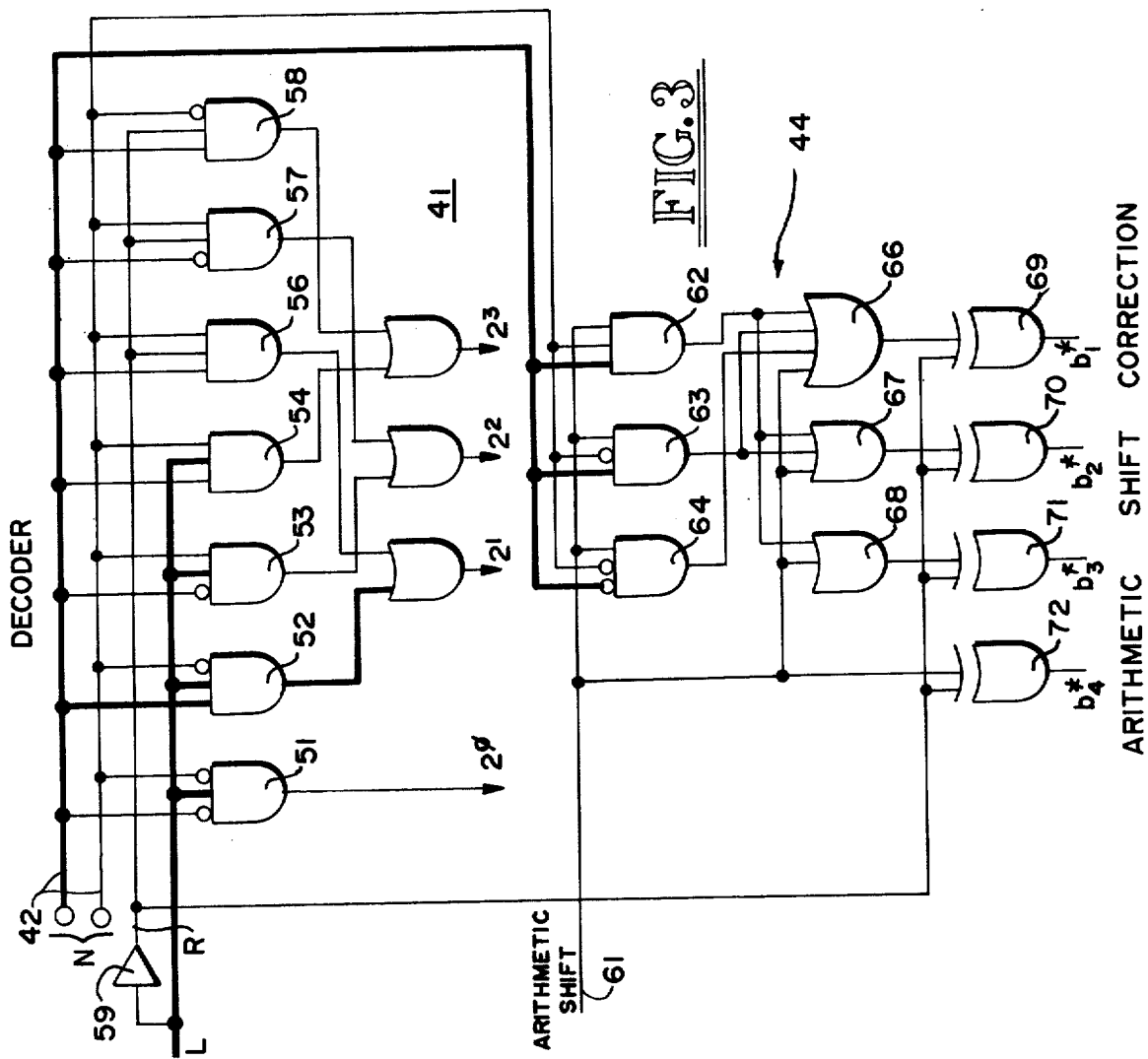
FIG. 3 is a more detailed block diagram of a portion of FIG. 1 again emphasizing the same typical operational example.

FIG. 3 illustrates in more detailed form decoder 41 and arithmetic shift register unit 44. Decoder unit 41 has an input the two line shift instruction 42 which, of course, has four binary states to selectively enable AND gates 51 through 54 or AND gates 56 through 58. These AND gates in addition have the left right direction instruction on line 43 where a true input on line 43 indicates left and is connected to the AND gates 51–54 and a false is coupled through the inverter 59 indicating a right shift to AND gates 56, 57 and 58.

The decoder 41 in essence, therefore, with the use of the AND gates 56, 57 and 58 accomplishes a right shift by taking the complement of $2^N$ or $2^{M-N}$. In the specific example being illustrated of a shift of one to the left in heavier outline, it is indicated that AND gate 52 is closed to produce an output on the OR gate representing the $2^1$ output of decoder 41.

Finally, the arithmetic shift correction unit 44 has as inputs the number of shift steps through the lines 42 and a direction instruction from the output of inverter 59 as well as the arithmetic shift instruction on line 61. A true on the line indicates set ones into all vacant locations in the output word. Shift correction unit 44 includes the AND gates 62, 63 and 64 which serve to decode the number of shift steps; the OR gates 66, 67 and 68 and the exclusive OR gates 69, 70, 71 and 72 which provide the asterisked outputs $b_1$ through $b_4$ which are respectively coupled to the OR gates 11 through 14 of FIG. 2.

Thus far a left shift operation has been specifically illustrated. For a right shift of one position, N, using the same binary word A of 0010 such word must be multiplied by $2^{M-N}$ which is $2^3$ where M is the word length. Referring to FIG. 2, the right shift instruction 37 would be true to thus provide an enabling signal to the group of AND gates to the left of dashed line 16. AND gate 20 would also have a true input from the one bit stored in the $a_2$ position of the register. Lastly, referring to decoder 41 illustrated in FIG. 3, the AND 58 would provide a true output to activate the $2^3$ output line of the decoder. This is due to the fact that the output of inverter 59 is now true. The $2^3$ output line of decoder 41 referring to FIG. 2 is coupled to AND gate 20. This AND gate will now have a 1 or true output. The OR gate 11 will provide a final output of 0001. Thus the binary output A has been shifted one position to the right. This has been accomplished by adding the partial products representative of the most significant bit half of the pseudo multiplication.

As an example of left rotation, it is assumed that a binary number A equal to 1010 has been inputed in shift register 10 and is to be left rotated one step. This will ultimately produce an output of 0101. With a rotation instruction at 46 all AND gates will be enabled in this respect except for the first level gates 17, 22, 26 and 31. Moreover, with one bits at the $a_4$ and $a_2$ locations, the gates on those skew lines will have enabling signals directed to them. Lastly, the decoder output will occur on the $2^1$ output line in the same manner as it occurred for the left shift one step example. With such enabling outputs AND gates 18 and 27 are closed to produce one outputs at the $b_1$ and $b_3$ locations to thus provide a final output of 0101 which is a left rotation of one position. As discussed above, this rotation has, of course, been accomplished by the merging of the most significant bit half and least significant bit half of the product.

Thus, the present invention has provided an improved parallel shifter which finds use in floating point arithmetic in computers and in general may be used for manipulation of data and can provide truncation in multiplication processes.

With the above construction a four bit shift register has been provided. Such shifter may be expanded to 8, 16 and 32 bits, etc. by a simple technique and yet substantially maintain its minimum time delay. FIGS. 4 through 8 illustrate such expansion to an 8 bit parallel shifter using the circuit of FIG. 2 as a basic building block.

Figure 4:
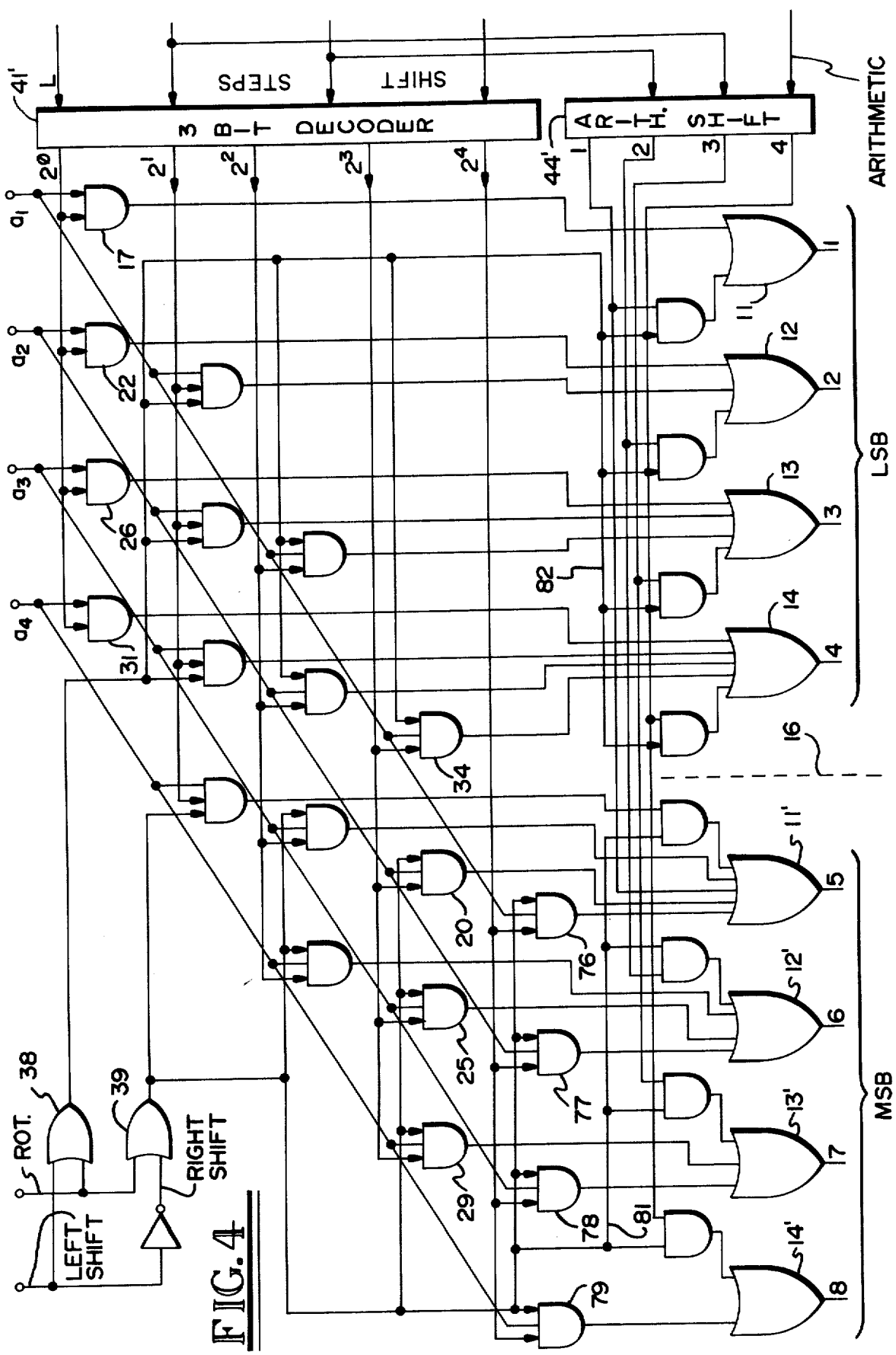
FIG. 4 is a modified form of the circuit of FIG. 1 useful in another embodiment of the invention.

When it is used as such FIG. 2, however, must be modified as illustrated in FIG. 4. First, it must accommodate a shift of four which is achieved by providing a three bit decoder 41' which now has a four bit shift output line designated $2^4$ and which drives or enables gates 76, 77, 78 and 79. The gates are merely an obvious extension of the AND gates representing the cross products of the most significant bits of the multiplication process as discussed above. The second major change is the spreading out or demerging of the most significant bit portion the final product and the least significant bit portion of the final product by use of the additional OR gates 11' through 14'. Thus in the configuration of FIG. 4, the shifting unit shown would not be capable of rotation.

Lastly, an arithmetic shift correction unit 44' drives the respective OR gates 11 through 14 and 11' through 14' by means of AND gates which are enabled from a coincident input from either the right shift output on line 81 or the left shift output on line 82.

Decoder 41' is illustrated in FIG. 5 with the number of shift steps input, N, being designated $n_1$, $n_2$, and $n_3$. The $n_3$ input, of course, is activated when four or more steps are desired since it has a binary weight of $2^2$. The $n_3$ input line is coupled to the AND gates 51' through 58' with an inverting input. This is substantially the only modification. The arithmetic shift circuit is identical to FIG. 3.

FIG. 6 illustrates mathematically the manner in which the 4 bit shifter of the present invention is expandable to eight bits etc. FIG. 6A illustrates a typical 8 bit binary number having a least significant bit portion A1 and most significant bit portion $A_2'$. As shown in FIG. 6B, $A_2'$ may be represented as a 4 bit binary number $A_2$ having the same weights as $A_1$ but multiplied by $2^4$.

The same is true as illustrated in FIG. 6C of the binary number by which the first number is multiplied by to provide the proper shift. It should be remembered, of course, that in this binary number, only one term is nonzero.

Multiplication of the numbers of FIGS. 6A and 6C is illustrated in 6D in abbreviated format and yields four cross products related by the illustrated power of two. The foregoing can be shown in a typical multiplication matrix as illustrated in 6E assuming that, for example, $b_2$ is equal to 1, indicating a left shift of one step; therefore $B_1$ is equal to 0010 and $B_2$ is equal to 0000. Since there is a left shift, $L=1$, and $n_1=1$ to provide the one step with no rotation, $R=0$. The various cross products are therefore as indicated binary partial products being shifted the number of steps indicated by the power of 2 in FIG. 6D. The desired output or product is indicated by the most significant bit portion $Y_9$ through $Y_{16}$ and the least significant bit portion $Y_1$ through $Y_8$ which merge the indicated MSB and LSB portions of the various partial products $A_1B_1$, $A_2B_1$, $A_1B_2$, and $A_2B_2$.

Figure 7:
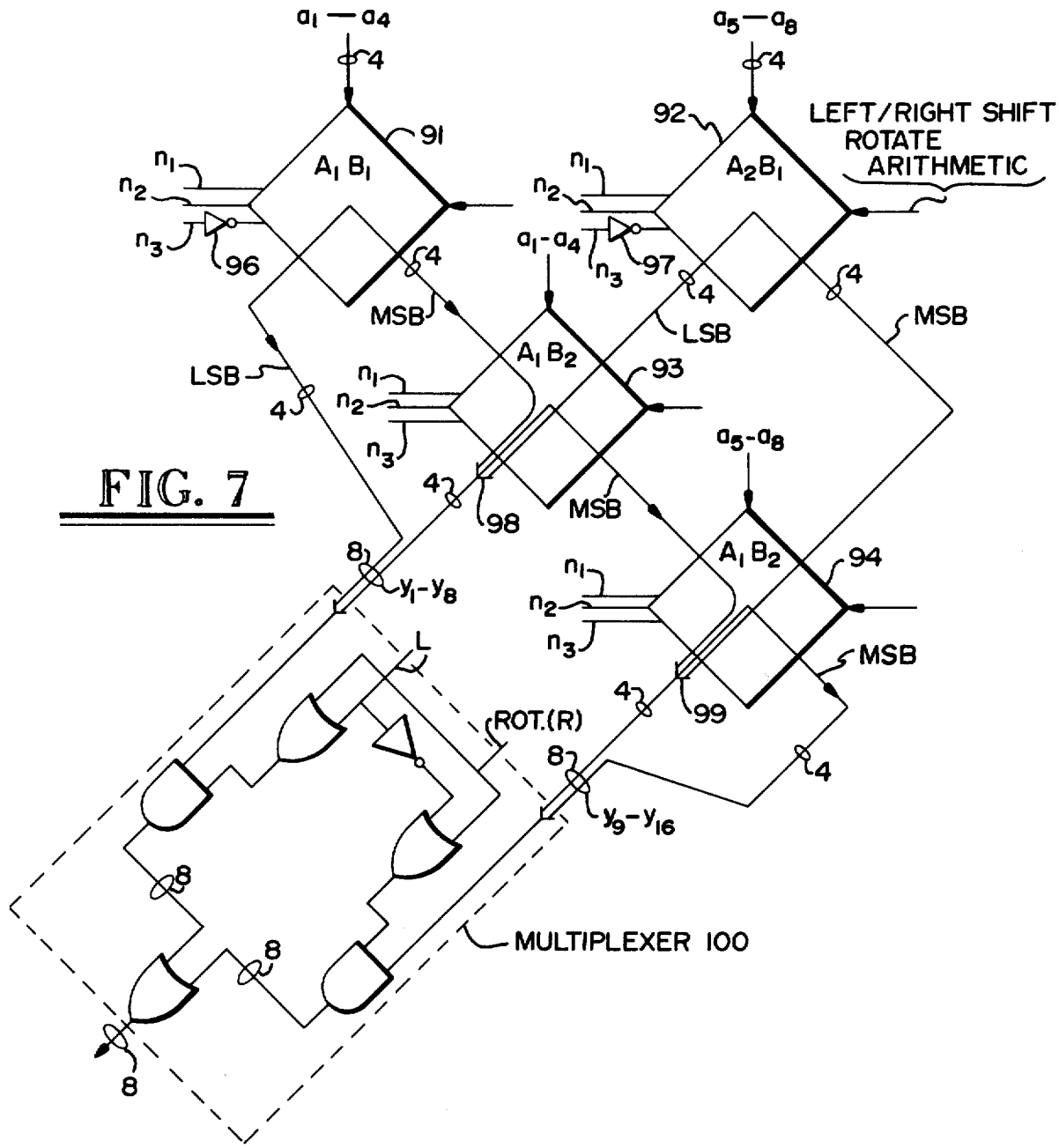
FIG. 7 is an interconnection diagram using the circuit of FIG. 4 as a basic building block.

The physical implementation of FIG. 6 is shown in FIG. 7. Four individual shifting units 99 through 94 are coupled together to provide an 8 bit parallel shifter. Each of the individual shifter units utilizes the circuit of FIG. 4 each having as common inputs $n_1$, $n_2$ and $n_3$ inputs indicating the number of shift steps and a left/-right shift, rotate and arithmetic inputs. The least significant bit portion of the input word, that is, $a_1-a_4$, which is four bits in length is inputed into shifter units 91 and 93 and the most significant bit portion, $a_5-a_8$, of the input word is inputed into the shifter units 92 and 94. Each shifter unit has a MSB and LSB output as indicated. These are also indicated in FIG. 4, of course. Shifters 91 and 92 are somewhat modified in that the $n_3$ inputs indicating a shift of four include inverters 96 and 97.

Referring now also to FIG. 6E each of the shifters 91 through 94 represents respectively the partial products $A_1B_1$, $A_2B_1$, $A_1B_2$, and $A_2B_2$ and are so designated. Examination of FIG. 6E reveals that to obtain the desired shifted output $Y_1-Y_8$, the MSB portion of the partial product $A_1B_1$ and the LSB portions of the partial products $A_2B_1$ and $A_1B_2$ must be added together. This is accomplished in conjunction with shifter unit 93, the three portions being added together by the wired OR connection 98. A wired OR connection is possible as discussed above in conjunction with the first embodiment of the invention since only one line of the three line wired OR will be nonzero. Thus output 98 in conjunction with the LSB output of unit 91 provides $Y_1-Y_8$.

Similarly, a wired OR connection 99 in conjunction with shifter 94 provides for the addition in the MSB portions of two partial products and the LSB portion of $A_2B_2$. And output 99 in conjunction with the MSB output of unit 94 provide $Y_9-Y_{16}$.

Thus, with the construction of FIG. 7 the basic four bit parallel shifter has been expanded to 8 bits by a construction of four similar shifter units utilizing the wired OR concept.

Selection of other $Y_1-Y_8$ or $Y_9-Y_{16}$ for left or right shift or their merger (of rotation is desired) is provided by multiplexer 100. The two examples of FIG. 8 shown respectively a left shift of five and a complimentary right shift of three. The two operations are of course identical except for a change in the "L" control signal.

What is claimed is:

1. A parallel shifter having minimum time delay comprising: storage register means for storing a group of bits arranged in increasing weight; a group of OR gates having outputs corresponding to said bits after having been shifted a predetermined direction and number of shift steps; and means for shifting said stored group of bits including, a plurality of AND gates conceptually arranged in a skewed multiplication matrix each representing a cross product of said group of bits multiplied by a binary number representing a power of 2 such power being indicative of the number of shift steps, said multiplication of said group of bits and said binary number forming a final product having a least significant half and a most significant half, each of said AND gates having an output respectively connected to one of said OR gates which has the same relative weight as such AND gate relative to the order of such AND gate in said least significant half of said final product or most significant half of said final product, said AND gates having inputs connected as follows—each AND gate is connected to a register bit which is the multiplicand for the cross product represented by such AND gate, first enabling means responsive to a left shift instruction is connected to AND gate inputs representing cross products corresponding to the least significant half of the final product, second enabling means responsive to a right shift instruction is connected to AND gate inputs representing cross products corresponding to the most significant half of the final product, and third enabling means having a plurality of outputs each respectively corresponding to one of said number of shift steps has each output respectively connected to a group of AND gate inputs representing cross products formed by a common multiplier bit of said binary number.

2. A shifter as in claim 1 which also serves as a rotator of said group of bits where the same group of said OR gates represent both the most and least significant halves of said final product and including means for concurrently activating said first and second enabling means whereby said most and least significant product halves are merged.

3. A shifter as in claim 1 where said third enabling means is responsive to shift direction as well as said number of shift steps to activate a predetermined one of said plurality of outputs.

4. A shifter as in claim 1 including arithmetic shift correction means connected to said OR gates and responsive to said number of shift steps and to said shift direction to insert binary "1"s in OR gates otherwise having vacant outputs due to said shift.

5. A shifter as in claim 1 where said group of OR gates includes a first portion representing the most significant half of the final product and a second portion representing the least significant half of the final product said AND gate outputs being respectively connected to the corresponding OR gate portion.

6. An expandable parallel shifter including first, second, third and fourth similar shifting units each of said units receiving a group of input bits and providing a shifted output divided into a most significant bit (MSB) portion and a least significant bit (LSB) portion said expandable parallel shifter receiving a binary input word having MSB and LSB portions, said LSB portion of said input word being coupled to the inputs of said first and third shifting units and said MSB portion to the inputs of said second and fourth shifting units and also including means for making the following interconnections: connecting the MSB output of said first unit and the LSB output of said second unit to the LSB output of said third unit in a wired OR; connecting the MSB output of said third unit and the MSB output of said second unit to the LSB output of said fourth unit in a wired OR; and utilizing the LSB output of said first unit and said wired OR output of said third unit to provide the LSB portion of a desired shifted output and utilizing the MSB output of said fourth unit and said wired OR output of said fourth unit to provide the MSB portion of a desired shifted output.

7. A shifter as in claim 6 where each of said shifting units includes storage register means for storing said group of input bits arranged in increasing weight; a group of OR gates having outputs corresponding to said bits after having been shifted a predetermined direction and number of shift steps; and means for shifting said stored group of bits including, a plurality of AND gates conceptually arranged in a skewed multiplication matrix each representing a cross product of said group of bits multiplied by a binary number representing a power of 2 such power being indicative of the number of shift steps, said multiplication of said group of bits and said binary number forming a final product having a least significant half and a most significant half, each of said AND gates having an output respectively connected to one of said OR gates which has the same relative weight as such AND gate relative to the order of such AND gate in said least significant half of said final product or most significant half of said final product, said AND gates having inputs connected as follows—each AND gate is connected to a register bit which is the multiplicand for the cross product represented by such AND gate, first enabling means responsive to a left shift instruction is connected to AND gate inputs representing cross products corresponding to the least significant half of the final product, second enabling means responsive to a right shift instruction is connected to AND gate inputs representing cross products corresponding to the most significant half of the final product, and third enabling means having a plurality of outputs each respectively corresponding to one of said number of shift steps has each output respectively connected to a group of AND gate inputs representing cross products formed by a common multiplier bit of said binary number.

* * * * *